(12) United States Patent
Solomon et al.

(10) Patent No.: US 10,346,879 B2
(45) Date of Patent: Jul. 9, 2019

(54) METHOD AND SYSTEM FOR IDENTIFYING WEB DOCUMENTS FOR ADVERTISEMENTS

(75) Inventors: Amiad Solomon, Bronx, NY (US); Moshe Koppel, Efrat (IL)

(73) Assignee: Sizmek Technologies, Inc., Atlanta, GA (US)

(*) Notice: Subject to any disclaimer, the term of this patent is extended or adjusted under 35 U.S.C. 154(b) by 613 days.

(21) Appl. No.: 12/615,282

(22) Filed: Nov. 10, 2009

(65) Prior Publication Data

US 2010/0125502 A1 May 20, 2010

Related U.S. Application Data

(60) Provisional application No. 61/115,562, filed on Nov. 18, 2008, provisional application No. 61/115,564, filed on Nov. 18, 2008.

(51) Int. Cl.
*G06Q 30/02* (2012.01)
*G06Q 10/10* (2012.01)

(52) U.S. Cl.
CPC ........ *G06Q 30/0269* (2013.01); *G06Q 10/10* (2013.01); *G06Q 30/02* (2013.01); *G06Q 30/0241* (2013.01); *G06Q 30/0254* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 4,994,966 A | * | 2/1991 | Hutchins | G06F 17/274 704/9 |
| 5,537,586 A | * | 7/1996 | Amram | G06F 16/353 |
| 5,819,260 A | * | 10/1998 | Lu | G06F 16/30 707/700 |
| 5,930,788 A | * | 7/1999 | Wical | G06F 16/353 |
| 6,014,651 A | * | 1/2000 | Crawford | G06F 9/5061 705/34 |
| 6,144,991 A | * | 11/2000 | England | H04L 29/06 709/205 |
| 6,714,975 B1 | * | 3/2004 | Aggarwal | G06Q 30/02 705/14.43 |
| 6,826,559 B1 | | 11/2004 | Ponte | |
| 6,892,354 B1 | | 5/2005 | Servan-Schreiber et al. | |
| 7,047,404 B1 | | 5/2006 | Doonan et al. | |

(Continued)

FOREIGN PATENT DOCUMENTS

WO WO-9829818 A1 * 7/1998 ......... G06F 17/2795

OTHER PUBLICATIONS

Herring et al ("Bridging the Gap: A Genre Analysis of Weblogs", Proceedings of the 37th Hawaii International Conference on System Sciences—2004).*

(Continued)

*Primary Examiner* — Mamon Obeid
(74) *Attorney, Agent, or Firm* — M&B IP Analysts, LLC

(57) ABSTRACT

A method for identifying web documents for presenting an advertisement. The method comprises receiving an advertisement for members of one or more demographic segment, identifying at least one web document with an editing style of an author from the demographic segment and allowing a presentation of the advertisement to at least one visitor of the at least one identified web document.

11 Claims, 5 Drawing Sheets

(56) References Cited

U.S. PATENT DOCUMENTS

| | | | |
|---|---|---|---|
| 7,124,093 B1* | 10/2006 | Graham | G06Q 30/02 705/14.41 |
| 7,228,493 B2* | 6/2007 | Kosak | G06F 16/958 715/234 |
| 7,296,064 B2* | 11/2007 | Yoon | H04N 7/163 709/217 |
| 7,302,404 B2 | 11/2007 | Solomon | |
| 7,320,031 B2 | 1/2008 | Konig et al. | |
| 7,346,606 B2* | 3/2008 | Bharat | G06Q 30/02 |
| 7,483,891 B2 | 1/2009 | Liu et al. | |
| 7,493,553 B1 | 2/2009 | Vora et al. | |
| 7,580,926 B2 | 8/2009 | Kapur et al. | |
| 7,647,299 B2 | 1/2010 | Harik | |
| 7,653,627 B2 | 1/2010 | Li et al. | |
| 7,680,796 B2 | 3/2010 | Yeh et al. | |
| 7,693,830 B2 | 4/2010 | Guha | |
| 7,711,743 B2 | 5/2010 | Cavagnaro et al. | |
| 7,716,199 B2 | 5/2010 | Guha | |
| 7,725,464 B2 | 5/2010 | Grubb et al. | |
| 7,734,624 B2 | 6/2010 | Anderson et al. | |
| 7,788,132 B2 | 8/2010 | Desikan et al. | |
| 7,827,060 B2 | 11/2010 | Wright et al. | |
| 7,827,158 B2* | 11/2010 | Hayakawa | G06F 16/3325 707/696 |
| 7,831,586 B2 | 11/2010 | Reitter et al. | |
| 7,987,194 B1* | 7/2011 | Walker | G06Q 30/0251 707/758 |
| 7,991,806 B2* | 8/2011 | Broder | G06F 16/367 707/809 |
| 7,996,282 B1 | 8/2011 | Scott et al. | |
| 8,001,105 B2 | 8/2011 | Bolivar et al. | |
| 8,140,515 B2* | 3/2012 | Pradhan | G06F 16/93 707/711 |
| 8,150,679 B2* | 4/2012 | Wick | G06Q 10/107 704/8 |
| 8,156,002 B2* | 4/2012 | van Zwol | G06Q 30/02 705/14.41 |
| 8,296,335 B2* | 10/2012 | Bouve | G06Q 20/3224 707/806 |
| 8,311,997 B1* | 11/2012 | Kauchak | G06Q 30/02 707/705 |
| 8,326,686 B2* | 12/2012 | Datar | G06Q 30/02 705/14.49 |
| 8,412,650 B2* | 4/2013 | Takamatsu | G06F 17/2785 706/12 |
| 8,538,836 B1 | 9/2013 | Scott et al. | |
| 8,645,817 B1* | 2/2014 | Fisher | G06F 16/9535 715/243 |
| 8,726,278 B1* | 5/2014 | Shawver | G06F 9/4881 718/100 |
| 8,732,605 B1* | 5/2014 | Falaki | G06Q 30/02 715/780 |
| 8,837,835 B1* | 9/2014 | Samwel, III | G06K 9/00483 382/192 |
| 9,043,333 B1* | 5/2015 | Look | G06F 16/29 707/744 |
| 9,117,219 B2 | 8/2015 | Solomon | G06Q 30/02 |
| 2001/0043364 A1* | 11/2001 | Messner | G06Q 10/0631 358/1.15 |
| 2001/0049620 A1* | 12/2001 | Blasko | G06Q 10/10 705/14.53 |
| 2002/0010681 A1* | 1/2002 | Hillegass | G06F 21/10 705/59 |
| 2002/0023042 A1* | 2/2002 | Solomon | G06Q 30/02 705/37 |
| 2002/0042870 A1* | 4/2002 | Rocray | G06F 9/4405 712/10 |
| 2002/0065857 A1* | 5/2002 | Michalewicz | G06F 16/355 715/259 |
| 2002/0065958 A1* | 5/2002 | Rocray | G06F 9/4405 719/331 |
| 2002/0083123 A1* | 6/2002 | Freedman | H04L 29/06 709/203 |
| 2002/0129063 A1* | 9/2002 | Kosak | G06F 16/958 715/234 |
| 2002/0138331 A1* | 9/2002 | Hosea | G06Q 10/06375 705/7.37 |
| 2003/0101024 A1* | 5/2003 | Adar | G06O 30/02 702/187 |
| 2003/0140311 A1* | 7/2003 | Lemon | G06F 16/30 715/239 |
| 2003/0172005 A1 | 9/2003 | Hellal et al. | |
| 2004/0039916 A1* | 2/2004 | Aldis | G06F 21/10 713/177 |
| 2004/0054589 A1* | 3/2004 | Nicholas | G06Q 30/02 705/14.52 |
| 2004/0059708 A1* | 3/2004 | Dean | G06Q 30/02 |
| 2004/0093327 A1 | 5/2004 | Anderson et al. | |
| 2005/0033641 A1 | 2/2005 | Jha et al. | |
| 2005/0114198 A1* | 5/2005 | Koningstein | G06Q 30/02 705/14.42 |
| 2005/0120390 A1* | 6/2005 | Nonoyama | H04N 7/17318 725/135 |
| 2005/0132347 A1* | 6/2005 | Harper | G06F 21/105 717/168 |
| 2005/0262428 A1* | 11/2005 | Little | G06F 16/9535 715/201 |
| 2005/0278620 A1 | 12/2005 | Baldwin et al. | |
| 2006/0010073 A1 | 1/2006 | Fisher et al. | |
| 2006/0074748 A1 | 4/2006 | Kline et al. | |
| 2006/0200420 A1* | 9/2006 | Osada | G06F 21/10 705/59 |
| 2006/0242147 A1* | 10/2006 | Gehrking | G06F 16/24578 |
| 2006/0287920 A1* | 12/2006 | Perkins | G06Q 30/02 705/14.49 |
| 2006/0293951 A1 | 12/2006 | Patel et al. | |
| 2007/0005417 A1 | 1/2007 | Desikan et al. | |
| 2007/0016469 A1* | 1/2007 | Bae | G06Q 30/02 705/14.54 |
| 2007/0027772 A1 | 2/2007 | Chou | |
| 2007/0033221 A1* | 2/2007 | Copperman | G06F 16/367 |
| 2007/0038614 A1 | 2/2007 | Guha | |
| 2007/0047817 A1* | 3/2007 | Abdulkader | G06K 9/00429 382/182 |
| 2007/0050389 A1 | 3/2007 | Kim et al. | |
| 2007/0050393 A1 | 3/2007 | Vogel et al. | |
| 2007/0061203 A1 | 3/2007 | Ellis et al. | |
| 2007/0067304 A1 | 3/2007 | Ives | |
| 2007/0079327 A1 | 4/2007 | Khoo et al. | |
| 2007/0112629 A1 | 5/2007 | Solomon et al. | |
| 2007/0136817 A1* | 6/2007 | Nguyen | G06F 21/10 726/26 |
| 2007/0156520 A1 | 7/2007 | Sharma | |
| 2007/0208621 A1 | 9/2007 | Park et al. | |
| 2007/0208728 A1* | 9/2007 | Zhang | G06F 16/337 |
| 2007/0214042 A1 | 9/2007 | Dominowska | |
| 2007/0233556 A1 | 10/2007 | Koningstein | |
| 2007/0244750 A1 | 10/2007 | Grannan et al. | |
| 2007/0260741 A1* | 11/2007 | Bezancon | G06Q 10/087 709/230 |
| 2007/0288431 A1 | 12/2007 | Reitter et al. | |
| 2008/0028100 A1* | 1/2008 | Adelman | G06Q 10/107 709/245 |
| 2008/0086356 A1 | 4/2008 | Glassman et al. | |
| 2008/0183742 A1 | 7/2008 | Kapur | |
| 2008/0195461 A1* | 8/2008 | Li | G06O 30/02 705/14.6 |
| 2008/0208754 A1* | 8/2008 | Zunke | G06F 21/10 705/59 |
| 2008/0235085 A1* | 9/2008 | Kovinsky | G06Q 30/02 705/14.49 |
| 2008/0235187 A1 | 9/2008 | Gade et al. | |
| 2008/0249855 A1 | 10/2008 | Collins et al. | |
| 2008/0281705 A1 | 11/2008 | Solomon | |
| 2008/0288341 A1* | 11/2008 | Garbe | G06O 30/02 705/14.64 |
| 2008/0300971 A1* | 12/2008 | Zeng | G06Q 30/02 705/14.41 |
| 2009/0019008 A1 | 1/2009 | Moore et al. | |

(56) References Cited

U.S. PATENT DOCUMENTS

| | | | |
|---|---|---|---|
| 2009/0024718 A1* | 1/2009 | Anagnostopoulos | G06Q 30/02 709/218 |
| 2009/0063229 A1 | 3/2009 | Coladonato et al. | |
| 2009/0063491 A1 | 3/2009 | Barclay et al. | |
| 2009/0076886 A1 | 3/2009 | Dulitz et al. | |
| 2009/0119218 A1* | 5/2009 | Ooki | G06F 21/121 705/59 |
| 2009/0119779 A1* | 5/2009 | Dean | G06F 21/105 726/26 |
| 2009/0132500 A1* | 5/2009 | Jones | G06F 16/951 |
| 2009/0171948 A1* | 7/2009 | Solomon | G06Q 30/02 |
| 2009/0193249 A1 | 7/2009 | Conrado et al. | |
| 2009/0228281 A1* | 9/2009 | Singleton | G10L 15/08 704/275 |
| 2009/0235187 A1 | 9/2009 | Kim et al. | |
| 2009/0265243 A1 | 10/2009 | Karassner et al. | |
| 2009/0276208 A1* | 11/2009 | Pagan | G06F 17/274 704/9 |
| 2010/0042504 A1 | 2/2010 | Shenfield et al. | |
| 2010/0088321 A1 | 4/2010 | Solomon et al. | |
| 2010/0114562 A1* | 5/2010 | Hutchinson et al. | 704/9 |
| 2010/0121790 A1* | 5/2010 | Klinkott | G06F 16/954 706/12 |
| 2010/0125502 A1* | 5/2010 | Solomon | G06Q 10/10 705/14.52 |
| 2010/0145808 A1* | 6/2010 | Hilbert | G06Q 30/02 705/14.66 |
| 2010/0161385 A1* | 6/2010 | Karypis | G06Q 10/04 705/7.31 |
| 2010/0185513 A1 | 7/2010 | Anderson et al. | |
| 2010/0191574 A1* | 7/2010 | Ziemann | G06Q 30/02 705/7.33 |
| 2010/0312469 A1* | 12/2010 | Chen | G01C 21/3608 701/408 |
| 2011/0055195 A1 | 3/2011 | Reitter et al. | |
| 2011/0086331 A1* | 4/2011 | Karov Zangvil | G09B 7/00 434/169 |
| 2012/0054053 A1* | 3/2012 | Cheek | G06Q 10/00 705/26.1 |
| 2012/0078715 A1* | 3/2012 | Li | G06Q 30/02 705/14.52 |
| 2012/0284119 A1* | 11/2012 | Hu | G06Q 30/0241 705/14.52 |
| 2012/0303446 A1* | 11/2012 | Busch | H04W 4/029 705/14.45 |
| 2013/0097166 A1* | 4/2013 | Fink | G06Q 30/02 707/737 |
| 2013/0125240 A1* | 5/2013 | Xu | H04L 63/12 726/26 |
| 2013/0304572 A1 | 11/2013 | Axe et al. | |
| 2014/0013449 A1* | 1/2014 | Vijay | G06F 21/10 726/29 |
| 2014/0108145 A1* | 4/2014 | Patel | G06O 30/0257 705/14.54 |
| 2014/0129211 A1* | 5/2014 | Kimelfeld | G06F 17/271 704/9 |
| 2016/0191540 A1* | 6/2016 | Fuka | G06F 16/86 726/4 |
| 2016/0203301 A1* | 7/2016 | Ooki | G06F 21/121 705/59 |
| 2016/0260127 A1* | 9/2016 | Bradley | G06F 16/9535 |

OTHER PUBLICATIONS

Huffaker, D. A. and Calvert, S. L. (2005), Gender, Identity, and Language Use in Teenage Blogs. Journal of Computer-Mediated Communication.*

Mei,et al (PageSense: Toward Stylewise Contextual Advertising via Visual Analysis of Web Pages) (Year: 2018).*

Response dated Jan. 3, 2012 to Official Action dated Aug. 5, 2011 From the US Patent and Trademark Office Re. U.S. Appl. No. 12/551,603.

Official Action dated Mar. 15, 2011 From the US Patent and Trademark Office Re. U.S. Appl. No. 12/347,027.

Official Action dated Mar. 9, 2012 From the US Patent and Trademark Office Re. U.S. Appl. No. 12/551,603.

Abadpour et al. "Pixel-Based Skin Detection for Pornography Filtering", Iranian Journal of Electrical & Electronic Engineering, 25 P., 2005.

Argamon et al. "Automatically Profiling the Author of an Anonymous Text", 13 P.

Liang et al. "Detecting Pornographic Images", Asia Pacific Institute of Information Technology, Kuala Lumpur, Malaysia, 6 P.

Restriction Official Action dated Mar. 28, 2012 From the US Patent and Trademark Office Re. U.S. Appl. No. 12/615,279.

Official Action dated Apr. 16, 2012 From the US Patent and Trademark Office Re. U.S. Appl. No. 12/347,027.

Response dated Jun. 15, 2011 to Official Action dated Mar. 15, 2011 From the US Patent and Trademark Office Re. U.S. Appl. No. 12/347,027.

Official Action dated Aug. 1, 2012 From the US Patent and Trademark Office Re. U.S. Appl. No. 12/615,279.

Official Action dated Aug. 5, 2011 From the US Patent and Trademark Office Re. U.S. Appl. No. 12/551,603.

Official Action dated Aug. 31, 2011 From the US Patent and Trademark Office Re. U.S. Appl. No. 12/347,027.

Official Action dated Oct. 18, 2012 From the US Patent and Trademark Office Re. U.S. Appl. No. 12/347,027.

Response dated Dec. 1, 2011 to Official Action dated Aug. 31, 2011 From the US Patent and Trademark Office Re. U.S. Appl. No. 12/347,027.

Official Action dated May 29, 2013 From the US Patent and Trademark Office Re. U.S. Appl. No. 12/615,279.

Applicant-Initiated Interview Summary dated Apr. 2, 2013 From the US Patent and Trademark Office Re. U.S. Appl. No. 12/347,027.

Applicant-Initiated Interview Summary dated Jul. 7, 2014 From the US Patent and Trademark Office Re. U.S. Appl. No. 12/347,027.

Official Action dated Aug. 21, 2014 From the US Patent and Trademark Office Re. U.S. Appl. No. 12/551,603.

Official Action dated Jul. 15, 2014 From the US Patent and Trademark Office Re. U.S. Appl. No. 12/347,027.

Advisory Action Before the Filing of an Appeal Brief dated Aug. 22, 2013 From the US Patent and Trademark Office Re. U.S. Appl. No. 12/615,279.

Official Action dated Feb. 24, 2014 From the US Patent and Trademark Office Re. U.S. Appl. No. 12/347,027.

Advisory Action Before the Filing of an Appeal Brief dated Oct. 30, 2014 From the US Patent and Trademark Office Re. U.S. Appl. No. 12/347,027.

Official Action dated Dec. 19, 2014 From the US Patent and Trademark Office Re. U.S. Appl. No. 12/615,279.

Official Action dated Jan. 13, 2015 From the US Patent and Trademark Office Re. U.S. Appl. No. 12/347,027.

Advisory Action Before the Filing of an Appeal Brief dated Sep. 17, 2015 From the US Patent and Trademark Office Re. U.S. Appl. No. 12/551,603.

Official Action dated Aug. 26, 2016 From the US Patent and Trademark Office Re. U.S. Appl. No. 12/615,279.

Official Action dated Jul. 26, 2016 From the US Patent and Trademark Office Re. U.S. Appl. No. 12/551,603.

Official Action dated Feb. 7, 2017 From the US Patent and Trademark Office Re. U.S. Appl. No. 12/615,279. (26 pages).

Official Actiondated May 4, 2015 From the US Patent and Trademark Office Re. U.S. Appl. No. 12/551,603.

Official Action dated Jun. 30, 2015 From the US Patent and Trademark Office Re. U.S. Appl. No. 12/615,279.

* cited by examiner

| Writing pattern | Style Features | Content Features |
|---|---|---|
| Female | personal pronoun, *I, me, him, my* | *cute, love, boyfriend, mom, feel* |
| Male | determiner, *the, of,* preposition-matter, *as* | *system, software, game, based, site* |
| Teens | *im, so, thats, dont, cant* | *haha, school, lol, wanna, bored* |
| Twenties | preposition, determiner, *of, the, in* | *apartment, office, work, job, bar* |
| Thirties+ | preposition, *the*, determiner, *of, in* | *years, wife, husband, daughter, children* |
| Bulgarian | conjunction-extension, pronoun-interactant, *however,* pronoun-conscious, *and* | *bulgaria, university, imagination, bulgarian, theoretical* |
| Czech | personal pronoun, *usually, did, not, very* | *czech, republic, able, care, started* |
| French | *indeed,* conjunction-elaboration, *will,* auxverb-future, auxverb-probability | *identity, europe, european, nation, gap* |
| Russian | *can't, i, can, over, every* | *russia, russian, crimes, moscow, crime* |
| Spanish | determiner-specific, *this, going_to, because, although* | *spain, restoration, comedy, related, hardcastle* |
| Neurotic | *myself,* subject pronoun, reflexive pronoun, preposition-behalf, pronoun-speaker | *put, feel, worry, says, hurt* |
| Non-neurotic | *little,* auxverbs-obligation, nonspecific determiner, *up,* preposition-agent | *reading, next, cool, tired, bed* |

FIG. 5

METHOD AND SYSTEM FOR IDENTIFYING WEB DOCUMENTS FOR ADVERTISEMENTS

RELATED APPLICATIONS

This application claims the benefit of priority of U.S. Provisional Patent Application No. 61/115,564, filed on Nov. 18, 2008 and U.S. Provisional Patent Application No. 61/115,562, filed on Nov. 18, 2008. The contents of the above Applications are incorporated herein by reference.

The teachings of U.S. Provisional Patent Application No. 61/071,707, filed on May 14, 2008, are also incorporated herein by reference.

FIELD AND BACKGROUND OF THE INVENTION

The present invention, in some embodiments thereof, relates to a system and a method for advertising and, more particularly, but not exclusively, to a system and a method for advertising according to characteristics provided by an advertiser.

Internet based advertising is an important mechanism that enterprises use to communicate with customers. With the introduction of the Internet, new advertising and communication possibilities with customers have been created, which offer the potential of greatly enhanced and more effective advertising techniques for businesses. Online visitors to web documents on the Internet may be directed to a company's web document in several ways including, for example, paid-for advertisements that link to a merchant's web document or links presented in the natural search results presented by a search engine, such as Yahoo!™, MSN™, or Google™ in response to a visitor's language query.

Consumers are showing an increasing preference for using the Internet when searching for purchases, as compared to traditional media outlets. These conclusions are supported by the increasing demand for, and proliferation of, high-speed Internet connections throughout the United States and worldwide. As the Internet grows in popularity and felt necessity, the volume of businesses advertising and communicating over the Internet promises to increase in a corresponding manner.

In light of this progression, a number of systems and methods have been developed for enhancing the Internet based advertising and to match advertisements to the viewer.

For example, U.S. Pat. No. 7,136,871, filed on Nov. 21, 2001, describes a system, including a planning module, a control module, and a receiver module, configured to schedule display of one or more advertising impressions of available advertising inventory. The planning module enables scheduling a requested quantity of advertising impressions in accordance with target criteria. Further, the planning module enables selecting an advertising impression goal for advertisement, assigning an advertising type and defining a weight for the advertisements. The control module receives the schedule, the advertising type and the defined weights and generates one or more metadata files that contain target criteria, advertising type and weights for the advertisements. The one or more metadata files, with the advertisements, are delivered to the receiver module that is configured to define a display frequency for the advertisements which based upon one or more of the metadata files. The receiver module selectively displays advertisement content associated with the advertisements to achieve the advertising impression goal.

SUMMARY OF THE INVENTION

According to some embodiments of the present invention there is provided a method for identifying web documents for presenting an advertisement, comprises receiving an advertisement for members of at least one demographic segment, identifying at least one web document with an editing style indicative of a creator of the at least one demographic segment, and allowing a presentation of the advertisement to at least one visitor of the at least one identified web document.

Optionally, the web documents comprises at least one member of a group consisting of: a blog, a micro-blogging page, a social network page, a webpage, a video blog, an audio blog, a podcast, a WORD document, a portable document format (PDF) document, an excel spreadsheet document, an extensible markup language (XML) page, a hypertext markup language (HTML) page, and an Internet page.

Optionally, each the demographic segment defines a member of a group consisting of: a gender, a social class, a socio economic class, a native language, a personality characteristic, an education level, an income level, and sociability.

Optionally, the identifying comprises identifying at least one demographic profiling marker indicative of the at least demographic segment in respective the web document.

More optionally, the at least one demographic profiling marker is a textual feature from the textual content of the at least one web document.

More optionally, the identifying comprises estimating the frequency of the textual feature in the textual content of the at least one web document.

According to some embodiments of the present invention there is provided a method for selecting web documents for presenting an advertisement. The method comprises identifying, for each of a plurality of web documents, a relation to at least one of a plurality of demographic segments, providing an advertisement for a target audience selected from the plurality of demographic segments, selecting at least one of the plurality of web documents according to a match between respective the at least one demographic segment and the target audience, and allowing a presentation of the advertisement to at least one visitor of the at least one selected web document.

Optionally, the relation is a relation to an author of a respective the web document.

Optionally, the plurality of demographic segments are based on a characteristic of a group consisting of: a gender, a social class, a socio economic class, a native language, a personality characteristic, an education level, an income level, and sociability.

Optionally, the identifying comprises identifying at least one demographic profiling marker indicative of the relation in respective the web document.

More optionally, at least one demographic profiling marker comprises at least one textual feature from the textual content of the respective web document.

More optionally, the at least one textual feature comprises a member of a group consisting of: a grammatical error, an orthographic error, morphological language feature, a lexical word selection, a syntactic wording selection, a prosodic wording selection, and a vocabulary.

More optionally, at least one demographic profiling marker comprises at least one visual feature from the visual content of the respective web document.

More optionally, at least one demographic profiling marker comprises at least one audible feature from the audible content of the respective web document.

More optionally, at least one demographic profiling marker comprises the source of respective the web document.

More optionally, at least one demographic profiling marker comprises at least one editorial feature from the respective web document.

More optionally, the demographic profiling marker is a combination of at least two of a group consisting of: a textual feature, visual feature, editorial feature, audible feature, and a contextual feature.

According to some embodiments of the present invention there is provided a system for selecting advertisement spots. The system comprises a content analysis module configured for identifying, for each of a plurality of web documents, a relation to at least one of a plurality of demographic segments and a receiving unit configured for receiving an advertisement for a target audience selected from the plurality of demographic segments. The system further comprises an advertisement spot selector configured for selecting at least one of the plurality of web documents according to a match between respective the at least one demographic segment and the target audience. The selection allows a presentation of the advertisement to at least one visitor of the at least one selected web document.

Optionally, the content analysis module is configured for identifying at least one demographic profiling marker indicative of the relation in respective the web document.

Optionally, the system further comprises a repository comprises a dataset mapping the relation between a plurality of demographic profiling markers and a plurality of editing styles each associated with at least one of the plurality of demographic segments, the content analysis module being configured for performing the identification using the map.

Optionally, an author of the at least one selected web document and the target audience are from a common of the plurality of demographic segments.

Optionally, the plurality of demographic segments are based on a characteristic of a group consisting of: a gender, a social class, a socio economic class, income level, income level, a native language, a personality characteristic, an education level, an income level, and sociability.

According to some embodiments of the present invention there is provided a method for identifying web documents for presenting an advertisement. The method comprises receiving an advertisement for members of at least one demographic segment, identifying at least one web document with an editing style intended to members of the at least one demographic segment, and allowing a presentation of the advertisement to at least one visitor of the at least one identified web document.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5 is an exemplary table of textual features for various writing patterns, according to some embodiments of the present invention.

DESCRIPTION OF SPECIFIC EMBODIMENTS OF THE INVENTION

Figure 1:
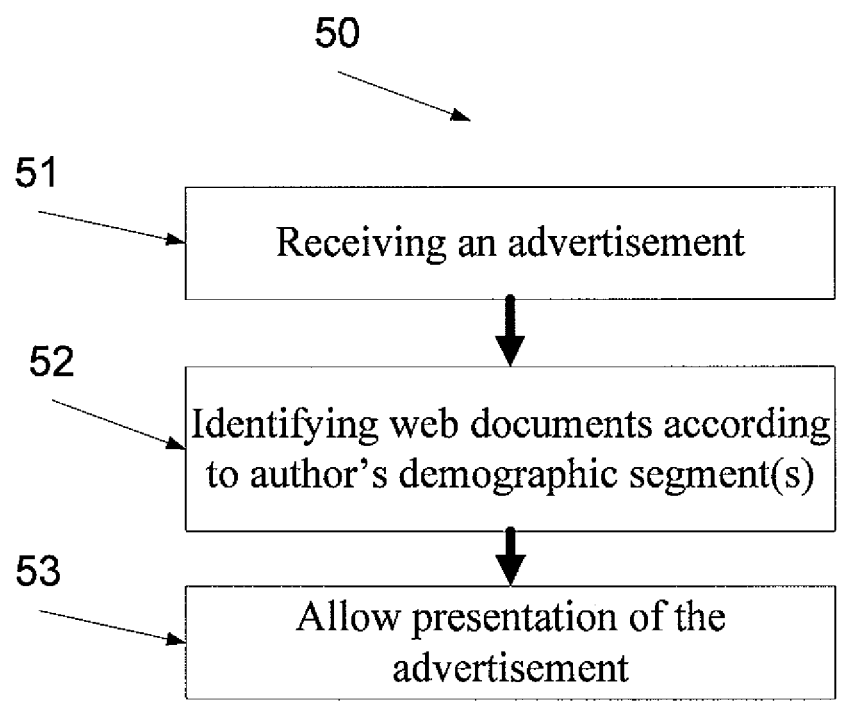
FIG. 1 is a flowchart of a method for advertising a product in web documents according to the target audience of an advertisement, according to some embodiments of the present invention.

The present invention, in some embodiments thereof, relates to a system and a method for advertising and, more particularly, but not exclusively, to a system and a method for advertising according to characteristics provided by an advertiser.

According to an aspect of some embodiments of the present invention there is provided a method and a system for identifying web documents, such as blogs, profile pages in social networks, such as FaceBook™ and MySpace™, editorials and/or comments in online newspapers and/or websites, talkbacks webpages, paid content articles, for example as provided at www.associatedcontent.com, blogs in blogging services, and micro-blogging pages of micro-blogging service, such as Twitter™, for presenting an advertisement. The method allows matching an advertisement that is targeted for members of a known demographic segment, such as age, gender, social class, social economic class and/or income level, to web documents which are relatively frequently accessed by members of this known demographic segment. The method is based on receiving the advertisement and identifying one or more web documents which have been created, for example written, kept, managed, and/or edited, with an editing style that is indicative for a target audience of the targeted demographic segment, for example, an editing style of a creator from the targeted demographic segment, as further described below. Web documents of a certain editing style are characterized by similar writing patterns, layout design, editing pattern and the like. The matching allows the presentation of the advertisement to visitors of the identified web documents.

Optionally, each one of the identified web documents is characterized by one or more demographic profiling markers which are indicative of a relation to a target audience of one or more demographic segments, for example to a relation of the creator of the website to one or more demographic segments. An demographic profiling marker may be a textual feature, a visual feature, an editorial feature, an audible feature, a contextual feature and/or a combination thereof, for example as described below.

According to other embodiments of the present invention a system for selecting web documents for advertisement is provided. The system comprises a content analysis module for analyzing web documents and identifying the demographic segments to which the creator and/or the target audience of each one of them is related. The system further comprises a receiving unit for receiving an advertisement for a certain demographic segment and an advertisement spot selector configured for selecting, from the at least one of the web documents. The selected websites having an editing style which is common in web documents indented to certain the demographic segment to which the received advertisement is intended. For example, the receiving unit may select the web sites by identifying creators which are related to the demographic segment to which the received advertisement is intended. Such a selection allows the presentation of the advertisement to visitors of the selected web documents.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a method 50 for identifying web documents which are created and/or edited by a member of a known demographic segment and/or for a known demographic segment, and using them for presenting an advertisement, optionally targeted. As used herein, web documents means blogs, profile pages in social networks, such as FaceBook™ and MySpace™, editorials and/or comments in online newspapers and/or websites, talkbacks webpages, paid content articles, for example as provided at www.associatedcontent.com, pages or messages in blogging services, micro-blogging pages of micro-blogging service, such as Twitter™, and/or any other web document that is edited with an editing style that is indicative of the demographic segment of the creator and/or editor thereof. This web document may be a webpage, a video blog, an audio blog, such as a podcast, a WORD document, a portable document format (PDF) document, an excel spreadsheet document, an extensible markup language (XML) page, a hypertext markup language (HTML) page, an Internet page, and/or any other content file that is accessible via a communication network or any segment thereof.

As further described below, the method allows matching an advertisement that is targeted for members of a known demographic segment to web documents which are relatively frequently accessed by members of this known demographic segment. First, as shown at 51, an advertisement, which may be represented by a generic definition defining an advertised product or a family of products, is provided. Optionally, the advertisement is provided from a remote advertisement server, such as shown at numeral 111 in FIG. 2. Now, as shown at 52, one or more web documents which have been created, for example written, kept, managed, and/or edited, with an editing style which is intended to the targeted demographic segment, for example, of an creator from the targeted demographic segment, for example as defined below, are identified. As shown at 53, the matching allows the presentation of the advertisement to visitors of the identified web documents. As used herein, a creator or author means a creator, an author, an editor, an administrator, a profile manager and/or any other entity that write, manage, and/or edit the content of the web document.

Figure 2:
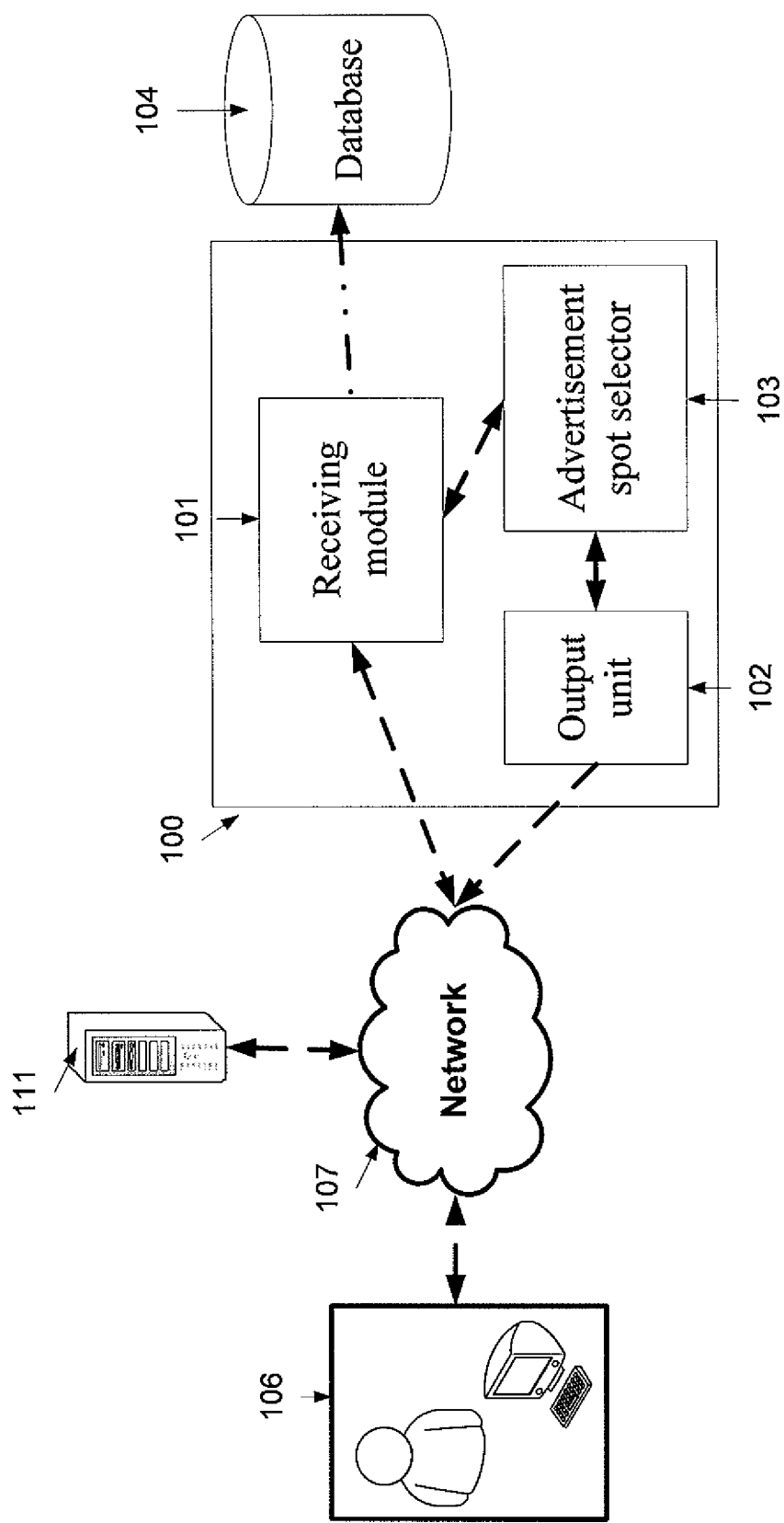
FIG. 2 is a schematic illustration of a system for selecting web documents according to the characteristics of the creator that create, keep, manage and/or write them, according to some embodiments of the present invention.

Reference is now made to FIG. 2, which is a schematic illustration of a system for selecting web documents, such as webpages, messages, and/or blog posts, social networks profile pages, online editorials, online comments, online talkbacks webpages, online paid content articles, and online micro-blogging pages according to demographic segments to which the editing style thereof is intended, in accordance with some embodiments of the present invention. The system allows classifying web documents, according to the demographic characteristics which are reflected from the respective editing style, and presenting an advertisement that is designated to a target audience having common and/or similar demographic characteristics. As used herein editing means editing the web document, designing the web document, managing web document, writing posts in the web document, arranging data objects in the web document, and/or changing the objects in the web document and/or the arrangement thereof. As used herein, an advertisement spot means an advertisement or series of advertisements for a product, including but not limited to a banner advertisement, an audio advertisement, a video advertisement, a splash page advertisement, a pop-up advertisement, a flash advertisement, a request for an advertisement space, a floating advertisement, or any other advertisement spot that is associated with a certain web document. As used herein, a product means a product, a service, a website, a show, and/or a movie and presenting means, playing, displaying, and/or activating the advertisement. Optionally, the system 100 comprises and/or connected to a database 104 that hosts a plurality of references, such as uniform resource locators (URLs) to web documents or to advertising spots in web documents, such as blogs, social network profiles and/or any other document which is available via computer network and edited with an editing style indicative of the demographic segment of the creator and/or editor thereof. It should be noted that the database 104 may include a plurality of repositories, which may be distributed over a plurality of hosting units, such as servers. For example, webpages and/or websites of an ad exchange network may be mapped in a dataset according to an analysis, such as a statistical analysis, of related page impressions, as further described below. The system 100 further comprises a receiving module 101 for receiving an advertisement or a description thereof, an advertisement spot locator 103 for generating a list that includes one or more references to advertisement spots associated with web documents, optionally from the database 104, and an output unit 102 for associating between the received advertisement and the selected advertisement spots in the list to allow the presenting thereof to visitors of the associated documents. Optionally, the advertisement spot locator 103 is connected to a search engine that is designed to retrieve references to web documents. Such a search engine may be used for providing a plurality of references, additionally and/or alternatively to the aforementioned plurality of references which are provided by the database 104.

Figure 3:
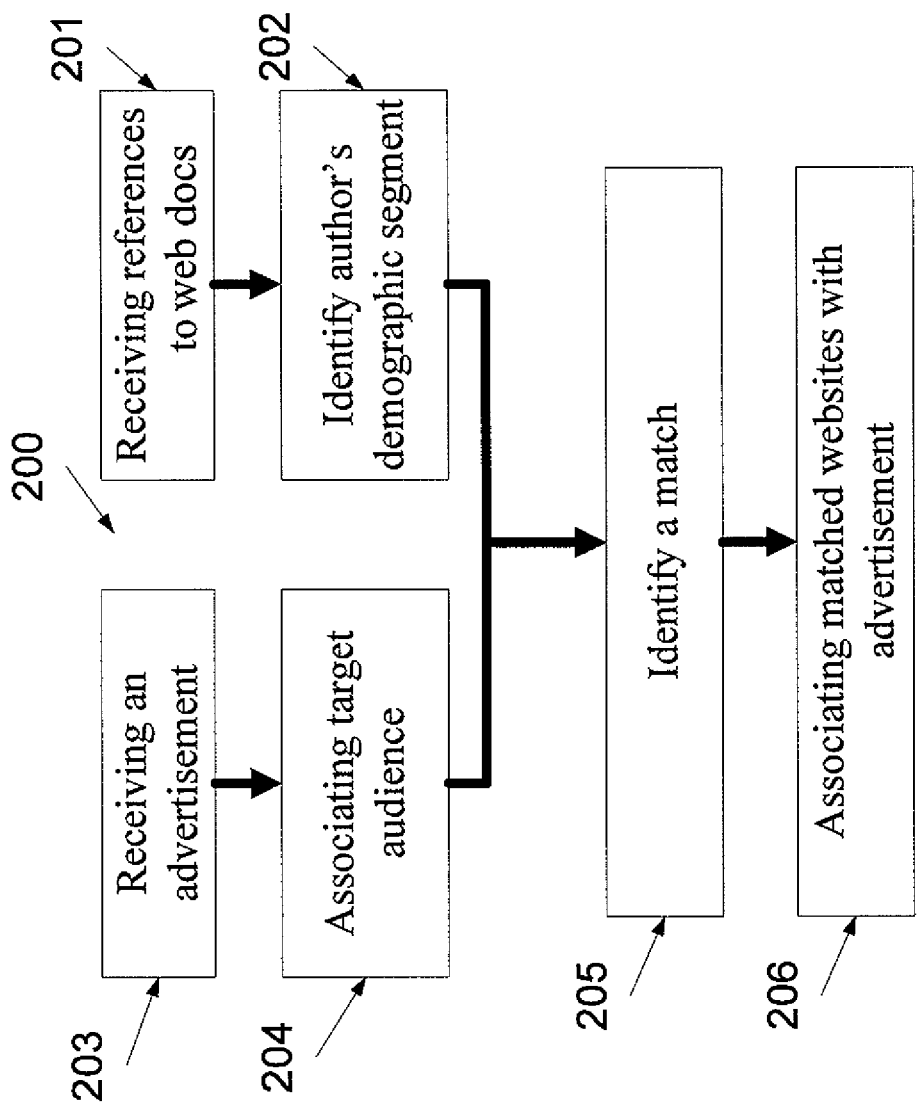
FIG. 3 is a flowchart of a method for advertising a product in web documents kept, managed, and/or written by an creator having an editing style that is estimated as attractive for a related target audience, according to some embodiments of the present invention.

Reference is now also made to FIG. 3, which is a flowchart of a method for advertising a product in web documents for a specified demographic segment, for example web documents kept and/or written by an author that optionally have an editing style, such as editing style, writing style and/or layout style which is estimated as appealing for a related target audience, according to some embodiments of the present invention. Examples for demographic segments may age, gender, social economic level, income level, nationality, personality, such as neurotic, open and/or diligent, native language, proficiency, socio-economic, such as education level and income level, social, such as well-linked and influential, and/or any intersection or union of various demographic segments. As used herein an editing style means a blogging style, instant messaging style, a writing style, a web document design style, a web document arrangement, a web document design style, an organization pattern of content and images on a web page, and/or any other content or arrangement of content which may be used for determining the demographic segment of the author or of the indented target audience.

First, as shown at 201, references to one or more web documents are provided, optionally as records in a database, for example as shown at 104. Additionally or alternatively references to web documents are provided by using the aforementioned search engine that is designed to retrieve references to web documents, for example that web documents that fulfill one or more criterions, such as blogs, frequently changing websites, and the like.

Now, as shown at 202, the demographic segment in each one of the web documents which are referred to in the provided references is identified. Optionally, one or more demographic profiling markers which are indicative of the demographic segment are identified and used to classify web documents, for example as described below.

For example, the content of one or more posts of a blog and/or pages of a social network profile is analyzed to extract one or more demographic profiling markers. As used herein, an demographic profiling marker is a textual feature, visual feature, editorial feature, audible feature, contextual feature and/or a combination thereof that is presented and/or available for presentation to users accessing a textual, visual, and/or audible post of a blog. For clarity, these features are exemplified below. The existence of a certain demographic profiling marker in a certain web document characterizes it as a web document intended for a certain demographic segment, for example a web document kept, edited and/or written by an author characterized by being part of the certain demographic segment.

In some embodiments of the present invention, the demographic profiling markers are textual features, such as content-based features and style-based features; see Campbell, R. S. & Pennebaker, J. W. (2003), *The secret life of pronouns: Flexibility in writing style and physical health, Psychological Science*, 14, 60-65, which is incorporated herein by reference. In such an embodiment, the textual feature is marked as a demographic profiling marker if the frequency of the occurrence thereof in the text of the website, optionally normalized by the number of words in the text, exceeds a predefined threshold. The style-based features may include lexical, syntactic, and/or vocabulary features and associated errors, such as grammatical or orthographic errors. The content-based features may include words and/or phrases which have a distinguishing nature, such as words and/or phrases which are used by authors of a certain country, culture, sex, personality, discipline or a combination thereof, or by authors which are creating content for these demographic segments.

Figure 4A:
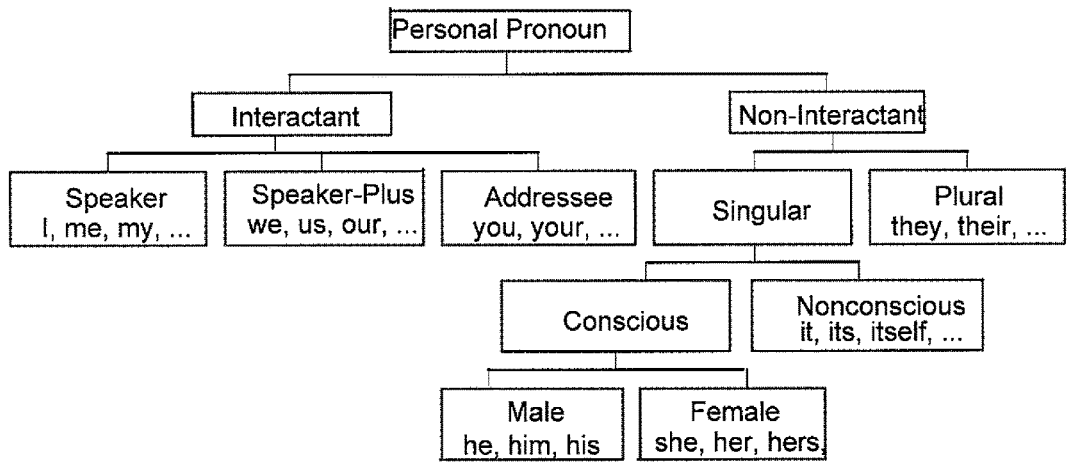
FIGS. 4A and 4B are schematic illustrations of trees representing a feature set of textual features, according to some embodiments of the present invention.
Figure 4B:
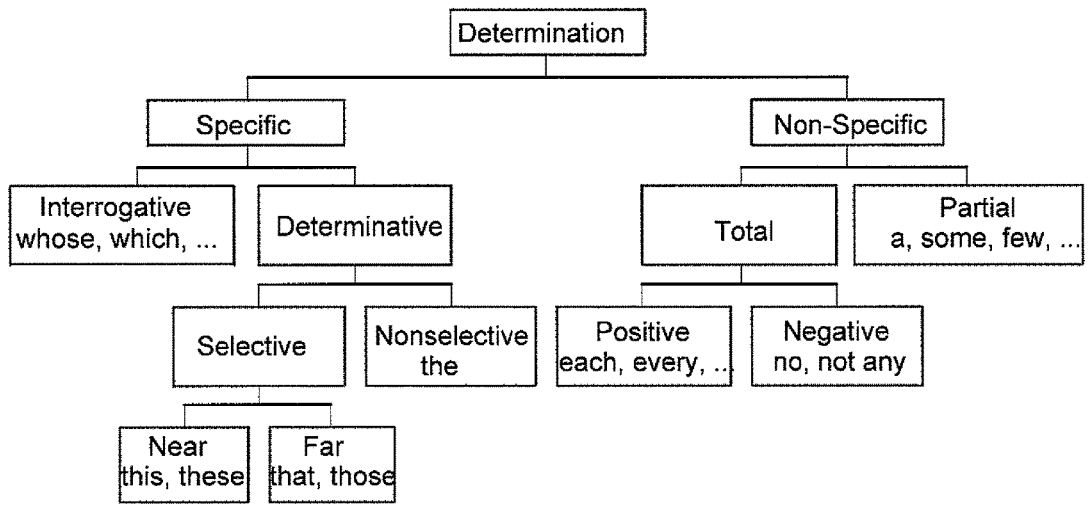

Optionally, a feature set that naturally subsumes both function words and parts-of-speech is created for each website in a manner that allows classifying some textual features which are used as demographic profiling markers. Optionally, the feature set is arranged as trees, for example as depicted in FIGS. 4A and 4B and described in Halliday, M. A. K., and Matthiessen, C. (2004). *An Introduction to Functional Grammar* (3rd ed.) (London: Arnold), which is incorporated herein by reference. The feature set provides taxonomies describing meaningful distinctions among various function words and parts-of-speech. The roots of the trees are labeled by sets of parts-of-speech, such as articles, auxiliary verbs, conjunctions, prepositions, and pronouns. The children of each node in the trees are labeled by meaningful subclasses of the parent node, such as the various sorts of personal pronouns and the leaves of the tree are labeled by sets of individual words. The set of function words corresponds to the set of all the articles, auxiliary verbs, conjunctions, prepositions and pronouns that appear as leaves in the tree. In such an embodiment, each node in the tree is composed of the frequency of the node feature's occurrence in a text normalized by the number of words in the text.

Reference is now also made to FIG. 5, which is an exemplary table of textual features for various writing patterns, according to some embodiments of the present invention. Authors from different demographic segments or authors writing for different demographic segments have different writing patterns which may be identified by different demographic profiling markers, such as different textual features. FIG. 5 specifies, for each member of a set of exemplary writing patterns, a number of characterizing demographic profiling markers. For example, the writing pattern "female" is characterized by a high prevalence of the following style based features: personal pronoun, "I", "me", "him", and "my" and a high prevalence of the following content style based features: cute, love, boyfriend, mom, feel. On the other hand, the writing pattern "male" is characterized by a high prevalence of the following style based features: determiner, "the", "of", "preposition-matter", and "as" and a high prevalence of the following content style based features: "system", "software", "game", "based", and "site".

As depicted in the table, other exemplary writing patterns which are indicative of other demographic segments, such as writing patterns of different age groups, different mother tongue and/or different personalities are characterized by a high prevalence of different textual features.

In some embodiments of the present invention, the demographic profiling markers includes visual and/or audible features, such as video clips, audio files, images, and/or graphic objects which are embedded into the analyzed web document. Such visual and/or audible features may be used, separately or in combination with other demographic profiling markers, to classify the demographic segments of the author of the web document or to classify the demographic segments of indented target audience of the web document.

Optionally, known audio, video and/or image analysis may be used for identifying and mapping these features, see for example, Durrell, Kevan, *Pornographic image detection with Gabor filters, Proc. SPIE Vol.* 4668, p. 1-9, *Applications of Artificial Neural Networks in Image Processing VII*, Nasser M. Nasrabadi; Aggelos K. Katsaggelos; N. Rea, Eds *Multimodal Periodicity Analysis for Illicit Content Detection in Videos, Visual Media Production*, 2006. *CVMP* 2006. 3rd European Conference on Volume, Issue, 2006 Page(s): 106-114, and Forsyth, David A. et al., *"Finding Pictures of Objects in Large Collections of Images,"* Proceedings, International Workshop on Object Recognition, Cambridge, 1996, which are incorporated herein by reference.

In some embodiments of the present invention, the demographic profiling markers includes source features, such as the uniform resource locator (URL) of the website, the common search term which is used for addressing the respective web document, the description and all tags of the web document and/or the posts thereof, the web document name, the titles in the virtual root, the deployment path, links from the web document, link to the web document and/or any combination thereof.

In some embodiments of the present invention, the demographic profiling markers of one or more of the analyzed web document includes editorial features. As used herein, an editorial feature is a feature that has an effect on the look and feel of the analyzed web document, such as a selected template and/or any object arrangement and/or prevalence in a document. Optionally, the editorial feature is identified by analyzing the graphical elements the graphical user interfaces (GUIs) and/or textual command language which is used to control and/or navigate in the web document. Optionally, the editorial feature is identified according to the opening webpage or post, the arrangement of video files and/or images in the webpage, the prevalence of video files and/or images in the webpage, the icons used to represent certain functions such as opening and closing files, directories and application programs, the size and position of windows; conventions for the meaning of different buttons on a mouse and keys on the keyboard, and/or the appearance and operation of menus. As the aforementioned demographic profiling markers, these demographic profiling markers may be used for identifying a writing pattern that is identified with one or more demographic segments. For example, a web document that includes a large number of graphic objects on a colorful background and or short text segments with variable fonts and/or embedded emoticons, may identified as a document created by a teenager.

In some embodiments of the present invention, the demographic profiling markers of one or more of the analyzed web document includes contextual features. In such an embodiment, a predefined combination of textual features, visual, editorial, and/or audible features is identified as demographic profiling markers. Optionally, the plurality of features, optionally weighted, are arranged in a vector and summed and/or matched with a predefined value and/or vector. For example, the presence of the word "love" in combination with a heart shaped emoticon may indicate that the author or the target audience of the webpage is related to one demographic segment while the presence of the word "love" in combination with a graph may indicate that the author or the target audience of the webpage is related to another demographic segment.

In some embodiments of the present invention, the plurality of web documents are clustered according to different editing styles which are associated with different demographic segments. In such embodiments, each cluster includes websites having similar demographic profiling markers and/or demographic profiling markers which are related to the same editing style. Optionally, some web documents are clustered to a number of different clusters. For example, the same website may be clustered as a member of a cluster identified by an editing style of author from the demographic segment of people between 20 and 30 and with as a member of a cluster identified by an editing style of an author from the demographic segment of women.

The demographic profiling markers, which are optionally prevailing textual features in the web document, as described above, characterize the editing style of the author and therefore may be used for determining whether the web document is suitable for an advertisement that is indented for a target audience which is associated, optionally positively intrigued, by documents having a similar editing style. Optionally, the editing style is an editing style authors from a common demographic segment. Examples for editing styles are writing patterns of authors which are related to a certain segment of the population, such as woman authors, male authors, neurotic authors, authors of certain proficiency, low social economic level authors, high social economic level authors, and paranoaic authors.

Optionally, a combination of demographic profiling markers is associated with one or more demographic segments and used for classifying the author or the target audience of the webpage as a member of a certain social economic class and/or any other classification that may be used for segmenting a group of potential customers as a targeted audience.

As described above, some or all of the analyzed web documents are tagged as matching to one or more editing styles, according to the demographic profiling markers which have been identified therein. Optionally, known learning machines and/or methods are used for identifying demographic profiling markers and mapping between them and editing styles. Such learning machines and/or methods are known in the art, and therefore not discussed herein in great detail, see S. Argamon, M. Koppel, J. Pennebaker and J. Schler (2007), *Automatically Profiling the Author of an Anonymous Text*, Communications of the ACM, published in http://www.cs.biu.ac.il/~koppel/papers/AuthorshipProfiling-cacm-final.pdf and incorporated herein by reference.

In some embodiment of the present invention, the learning is performed as follows: features are identified in each one of a plurality of exemplary web documents and arranged in a numerical vector $X=(x_1, \ldots, x_i, \ldots, x_n)$, where n denotes the number of features and $x_i$ denotes the relative frequency of feature i in the document. Such a vector allows the applying of machine-learning algorithms that identify classifiers, tag them as demographic profiling markers, and optionally use them for assigning the related documents to one or more demographic segments. Optionally, the classifiers are identified by generating a weight vector $W^j= (w_1^j, \ldots, w_i^j, \ldots, w_n^j)$ for each demographic segments $c_j$ and then assign a document, X, to the demographic segment for which the inner product $W^j \cdot X$ is maximal. There are a number of effective algorithms for learning the weight vectors, such as a Bayesian multi-class regression to (BMR) algorithm, for example see Crammer, K. and Singer, Y. (2003), *Ultraconservative Online Algorithms for Multiclass Problems, Journal of Machine Learning Research*, 3:951-991, Genkin, A., Lewis, D. D., and Madigan, D. (2006), *Large-scale Bayesian logistic regression for text categorization, Technimetrics*, and Koppel, M., Schler, J., Argamon, S., and Pennebaker, J. W. (2006), *Effects of age and gender on blogging, Presented at AAAI* 2006 *Spring Symposium on Computational Approaches to Analyzing Weblogs*, Stanford, Calif., March 2006 which are incorporated herein by reference.

As shown at 203, one or more advertisements which are designed to be presented in relation and/or in certain web documents are received and/or tagged. Each advertisement may be a targeted advertisement designed to address a certain target audience that has been identified for the advertised product. For example, an advertisement for premium shaving cream may be targeted advertisement designed for a group of individuals having a customer prototype of a male, between 30 and 50 of a high social economy class, and an average yearly income of $120,000.

As shown at 204, each one of the received advertisements is tagged with a specific target audience of a predefined demographic segment that has been identified for the advertised product. Optionally, the target audience is associated with requested editing styles of authors from the predefined demographic segment. Optionally, the system 100 comprises and/or connected to a map, such as a list, that describes connections between target audiences and editing styles. Such a map may be used for identifying which editing styles should be associated with an advertisement that is targeted for a certain audience. It should be noted that such an association may be done manually, automatically, and/or semi manually.

For example, a target audience of middle class women in the age between 30 and 50 is mapped, by the map, to editing style of web document authors having a writing style and/or reputation which are most likely to attract such middle class women. Optionally, the map is defined in a manner that a target audience is associated with editing styles, such as writing patterns, of web document authors having similar, or substantially similar, characteristics to its member. For example, a target audience of a low class man in the age between 15 and 20 is mapped to one or more editing styles of web document authors in the same social economic class, income level, sex and/or age.

Now, as shown at 205, one or more matching web documents are identified according to a match between the target audience and the demographic segment of the authors of the web documents. As described above, one or more exemplary demographic profiling markers are identified in each one of the web documents in a manner that allows identifying the demographic segment of the author thereof. By identifying a match between the target audience and the demographic segment of the authors of the web documents, advertisement in proximity to content that is most likely to have the target audience that has been identified for the advertised product may be found.

As described above, one or more demographic profiling markers are identified in each web document. These demographic profiling markers may be used for classifying a web document of the plurality of web documents as created by an author of a certain demographic segment. In such an embodiment, the target audience of the received advertisement is matched with one or more of clusters having an association with respective demographic segments. In such a manner, one or more clusters may be identified as including web documents which are suitable for the received advertisement. For example, an advertisement that has been associated with a target audience of the demographic segment of people between 20 and 30 years old from a high social economic class may be matched with web documents clustered in a cluster of similar demographic segments, such as a demographic segment of people between 20 and 30 years old, a demographic segment of high social economic class, a union of the members of the groups, and/or intersection of the members of the groups.

Now, as shown at 206, the matched web documents are associated with the received advertisement. In such a manner, the received advertisement is presented and/or otherwise provided to visitors of the matched web documents. As the matched web documents have been identified as web documents which are accessed by member of a demographic segment that has been identified by the providers of the advertisement as suitable for the promotion of the advertised product, the advertisement exposure is relativity efficient. For example, when the received advertisement are associated with a demographic segment of an author from a high socio-economic class, the identified web documents are created, for example managed, kept, and/or written, by an author having of an editing style which presumably has a target audience that includes members of the high socio-economic class.

It is expected that during the life of a patent maturing from this application many relevant methods and systems will be developed and the scope of the term network, web document, and/or client terminal is intended to include all such new technologies a priori.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized system for selecting advertisement spots for web documents, comprising:
   a program store storing code
   a database storing a dataset mapping between at least one of a plurality of writing patterns, at least one editorial feature, and at least one of a plurality of demographic segments, wherein each of said plurality of writing patterns comprises a frequency of occurrence of a member from a group consisting of an article, an auxiliary verb, a conjunction, a preposition, and a pronoun, wherein the at least one editorial feature is a feature that has an effect on the look and feel of an analyzed web document; and
   a hardware processor coupled to a data interface connected to a network, said database, and said program store for implementing stored code, the code comprising:
   code to identify, using said hardware processor, at least one writing pattern in each of a plurality of web documents, wherein said at least one writing pattern is selected from a plurality of writing patterns, and to identify at least one editorial feature in each of said plurality of web documents, wherein said at least one writing pattern maps to at least one of said plurality of demographic segments, said mapped at least one demographic segment being a demographic segment of a targeted audience of each of said plurality of web documents, wherein said at least one editorial feature is identified by analyzing the layout of graphical elements of a graphical user interface (GUI) of a respective web document of said plurality of web documents, wherein said analyzing the layout includes one or more members selected from the group consisting of: arrangement of at least one of video files and images in the web document, prevalence of at least one of video files and images in the web document, icons used to represent functions, and size and position of windows;
   code to receive by said hardware processor through said data interface over said network an advertisement and a target demographic segment from an advertisement server,
   code to select, using said hardware processor, a cluster of web documents from said plurality of web documents such that said at least one writing pattern and said at least one editorial feature of each member of said cluster is associated with a demographic segment of said targeted audience of web documents that corresponds to said target demographic segment, and
   code to send instructions over a network to a client terminal to present said advertisement when said member of said cluster is rendered by a browser of said client terminal;
   wherein as a response of executing said sent instructions when at least one visitor sends a request to view said member of said cluster, said advertisement and said member are presented together in said browser to said at least one visitor.

2. The computerized system of claim 1, wherein said plurality of demographic segments are based on at least one characteristic of a group consisting of: a gender, a social class, a socio economic class, a native language, a personality characteristic, an education level, an income level, and sociability.

3. A computer usable non-transitory storage medium having a computer program embodied thereon for causing a suitably programmed system to select advertisement spots for web documents, by performing the following steps when said computer program is executed by a processor, the steps comprising:
   providing database storing a dataset mapping between at least one of a plurality of writing patterns, at least one editorial feature, and at least one of a plurality of demographic segments, wherein each of said plurality of writing patterns comprises a frequency of occurrence of a member from a group consisting of an article, an auxiliary verb, a conjunction, a preposition, and a pronoun, wherein the at least one editorial feature is a feature that has an effect on the look and feel of an analyzed web document;
   identifying at least one writing pattern in each of a plurality of web documents, wherein said at least one writing pattern is selected from a plurality of writing patterns, and identifying at least one editorial feature in each of said plurality of web documents, wherein said at least one writing pattern maps to at least one of said plurality of demographic segments, said mapped at least one demographic segment being a demographic segment of a targeted audience of each of said plurality of web documents, wherein said at least one editorial feature is identified by analyzing the layout of graphical elements of a graphical user interface (GUI) of a respective web document of said plurality of web documents, wherein said analyzing the layout includes one or more members selected from the group consisting of: arrangement of at least one of video files and images in the web document, prevalence of at least one of video files and images in the web document, icons used to represent functions, and size and position of windows;

receiving an advertisement and a target demographic segment;

selecting a cluster of web documents from said plurality of web documents such that respective said at least one writing pattern and said at least one editorial feature of each member of said cluster is associated with a demographic segment of said targeted audience of web documents that corresponds to said target demographic segment; and sending instructions to present said advertisement when said member of said cluster is rendered by a browser;

wherein as a response of executing said sent instructions when at least one visitor sends a request to view said member of said cluster, said advertisement and said member are presented together in said browser to said at least one visitor.

4. The system of claim 1, wherein each of said plurality of writing patterns comprises at least one content-based textual feature and at least one style-based textual feature, wherein combination of said at least one content-based textual feature and at least one style-based textual feature are specific to one of said plurality of demographic segments.

5. The computerized system of claim 1, wherein each of said plurality of writing patterns comprises a further association with a member from a group consisting of demographically distinct lexical features, demographically distinct syntactic features, demographically distinct vocabulary features, demographically distinct grammatical errors and demographically distinct orthographic errors, and wherein said further association determines at least one of said plurality of demographic segments.

6. The computer usable non-transitory storage medium system of claim 3, wherein each of said plurality of writing patterns comprises at least one content-based textual feature and at least one style-based textual feature, wherein combination of said at least one content-based textual feature and at least one style-based textual feature are specific to one of said plurality of demographic segments.

7. The computer usable non-transitory storage medium system of claim 3, wherein each of said plurality of writing patterns comprises a further association with a member from a group consisting of demographically distinct lexical features, demographically distinct syntactic features, demographically distinct vocabulary features, demographically distinct grammatical errors and demographically distinct orthographic errors, and wherein said further association determines at least one of said plurality of demographic segments.

8. The computerized system of claim 1, wherein each of said plurality of writing patterns further comprises one of a plurality of certain web document layout designs, each of said plurality of certain web document layout designs associated with one of said plurality of demographic segments, wherein each of said plurality of certain web document layout designs comprises an demographically distinct organization pattern of content and images on a web document.

9. A method for selecting advertisement spots for web documents, comprising:

providing database storing a dataset mapping between at least one of a plurality of writing patterns, at least one editorial feature, and at least one of a plurality of demographic segments, wherein each of said plurality of writing patterns comprises a frequency of occurrence of a member from a group consisting of an article, an auxiliary verb, a conjunction, a preposition, and a pronoun, wherein the at least one editorial feature is a feature that has an effect on the look and feel of an analyzed web document;

identifying at least one writing pattern in each of a plurality of web documents, wherein said at least one writing pattern is selected from a plurality of writing patterns, wherein said at least one writing pattern maps to at least one of the plurality of demographic segments, said mapped at least one demographic segment being a demographic segment of a targeted audience of each of said plurality of web documents, and identifying at least one editorial feature in each of said plurality of web documents, wherein said at least one editorial feature is identified by analyzing the layout of graphical elements of a graphical user interface (GUI) of a respective web document of said plurality of web documents, wherein said analyzing the layout includes one or more members selected from the group consisting of: arrangement of at least one of video files and images in the web document, prevalence of at least one of video files and images in the web document, icons used to represent functions, and size and position of windows, wherein said at least one editorial feature maps to at least one of the plurality of demographic segments;

receiving an advertisement and a target demographic segment;

selecting a cluster of web documents from said plurality of web documents such that respective said at least one writing pattern and said at least one editorial feature of each member of said cluster is associated with a demographic segment of said targeted audience of web documents that corresponds to said target demographic segment; and sending instructions to present said advertisement when said member of said cluster is rendered by a browser;

wherein as a response of executing said sent instructions when at least one visitor sends a request to view said member of said cluster, said advertisement and said member are presented together in said browser to said at least one visitor.

10. The method of claim 9, wherein said plurality of demographic segments are based on at least one characteristic of a group consisting of: a gender, a social class, a socio economic class, a native language, a personality characteristic, an education level, an income level, and sociability.

11. The method of claim 9, wherein said plurality of writing patterns comprise a further association with a member from a group consisting of demographically distinct lexical features, demographically distinct syntactic features, demographically distinct vocabulary features, demographically distinct grammatical errors and demographically distinct orthographic errors, and wherein said further association determines at least one of said plurality of demographic segments.

* * * * *